United States Patent
Richards et al.

(10) Patent No.: US 10,498,696 B2
(45) Date of Patent: Dec. 3, 2019

(54) APPLYING A CONSISTENT HASH TO A DISTRIBUTED DOMAIN NAME SERVER CACHE

(71) Applicant: EMC IP Holding Company LLC, Hopkinton, MA (US)

(72) Inventors: Antony Richards, Rose Bay (AU); Douglas Kilpatrick, Seattle, WA (US); Ronald Steinke, Tacoma, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 128 days.

(21) Appl. No.: 15/884,886

(22) Filed: Jan. 31, 2018

(65) Prior Publication Data
US 2019/0238505 A1    Aug. 1, 2019

(51) Int. Cl.
 *G06F 15/16* (2006.01)
 *H04L 29/12* (2006.01)
 *G06F 16/182* (2019.01)

(52) U.S. Cl.
CPC ........ *H04L 61/6009* (2013.01); *G06F 16/182* (2019.01); *H04L 61/10* (2013.01); *H04L 61/1511* (2013.01)

(58) Field of Classification Search
CPC ... H04L 61/1511; H04L 61/10; H04L 61/6009
See application file for complete search history.

(56) References Cited

U.S. PATENT DOCUMENTS

| | | | | |
|---|---|---|---|---|
| 2001/0034792 | A1* | 10/2001 | Swildens | H04L 29/06 709/238 |
| 2002/0007413 | A1* | 1/2002 | Garcia-Luna-Aceves | G06F 12/1483 709/229 |
| 2002/0010737 | A1* | 1/2002 | Garcia-Luna-Aceves | G06F 12/1483 709/203 |
| 2002/0010798 | A1* | 1/2002 | Ben-Shaul | H04L 29/12066 709/247 |
| 2010/0274970 | A1* | 10/2010 | Treuhaft | H04L 29/12066 711/118 |
| 2012/0110113 | A1* | 5/2012 | Lee | H04L 67/2852 709/214 |

(Continued)

OTHER PUBLICATIONS

Karger et al., Web Caching with Consistent Hashing, 1999, 11 pages. (Year: 1999).*

*Primary Examiner* — Hieu T Hoang
(74) *Attorney, Agent, or Firm* — Krishnendu Gupta

(57) ABSTRACT

Implementations are provided herein for using a distributed DNS cache that is distributed among nodes of a cluster of nodes operating as a distributed file system. A consistent hash can be used to determine a resolution node for a DNS request asking to resolve a specific FQDN. The inputs to the consistent hashing algorithm can be the FQDN, a set of available nodes, and a set of all possible nodes. By using a consistent hash, the process can reduce the sensitivity of the hashing algorithm output from changing when nodes added or removed as participants in the distributed cache service. As each node in the cluster of nodes can independently calculate a resolution node for specific FQDN, there is no need to send control messages between nodes, as each node only needs to be aware of the set of available nodes in the cluster of nodes.

20 Claims, 7 Drawing Sheets

(56) References Cited

U.S. PATENT DOCUMENTS

| | | | |
|---|---|---|---|
| 2012/0198043 A1* | 8/2012 | Hesketh | H04L 29/1265 709/223 |
| 2012/0239725 A1* | 9/2012 | Hartrick | H04L 69/161 709/203 |
| 2013/0145099 A1* | 6/2013 | Liu | H04L 67/2842 711/133 |
| 2017/0111389 A1* | 4/2017 | Kasman | H04L 63/1458 |
| 2017/0126617 A1* | 5/2017 | Qi | H04L 61/1511 |
| 2018/0278680 A1* | 9/2018 | Liu | H04L 29/08 |

* cited by examiner

| DNS RESOLUTION OUTPUT CANDIDATE TABLE OF CONSISTENT HASH | | | |
|---|---|---|---|
| NODE 1 | NODE 2 | NODE 3 | NODE 4 |

FIG. 2A

| DNS RESOLUTION OUTPUT CANDIDATE TABLE OF CONSISTENT HASH AFTER ADDING A NODE | | | | |
|---|---|---|---|---|
| NODE 1 | NODE 2 | NODE 3 | NODE 4 | NODE 5 |

FIG. 2B

| DNS RESOLUTION OUTPUT CANDIDATE TABLE OF CONSISTENT HASH AFTER NODE REMOVAL | | |
|---|---|---|
| NODE 1 | NODE 2 | NODE 4 |

APPLYING A CONSISTENT HASH TO A DISTRIBUTED DOMAIN NAME SERVER CACHE

FIELD OF THE INVENTION

This invention relates generally to processing data, and more particularly to systems and methods for maintaining a distributed domain name server cache using a consistent hash.

BACKGROUND OF THE INVENTION

Distributed file systems offer many compelling advantages in establishing high performance computing environments. For example, in a cluster of nodes operating as a distributed file system, adding nodes to the cluster can allow for the resources of the cluster to expand at large scale, creating clusters that can include hundreds of nodes. In some distributed file systems, there is a need to process domain name server ("DNS") requests by clients of the distributed file system. Clients can connect to one node of the cluster and request that a DNS address be resolved.

One way to process DNS requests would be for each individual node to maintain a local DNS cache that maintained entries for every address that has been historically resolved by the cluster. If the node did not have the specific DNS request cached locally, the node could look up the DNS address in an external DNS server and then store the result in the node's local cache. However, having each node in cluster of nodes store large amounts of redundant DNS data could consume large amounts of storage and/or cache resources. In addition, the amount of backplane communications necessary to synchronize the local DNS caches among hundreds of nodes could consume high amounts of network resources. Thus, there exists a need to efficiently maintain a distributed DNS cache among nodes in a cluster of nodes operating as a distributed file system that both reduces the amount of locally cached DNS addresses in each node as well as reducing the amount of intra-cluster communication required to maintain the distributed DNS cache.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a distributed Domain Name Server ("DNS") cache among a cluster of nodes operating as a distributed file system can be maintained. A first node among the cluster of nodes can receive a request from a client to resolve a Fully Qualified Domain Name ("FQDN"). A consistent hash can be used to associate the request with a resolution node among the cluster of nodes, wherein a set of inputs to the consistent hash include at least the FQDN, a set of available nodes among the cluster of nodes, and the cluster of nodes. The request can be directed to the resolution node. The resolution node can determine a DNS result based on the request. The DNS result can then be sent to the client.

In another aspect, it can be determined whether the FQDN is associated with a previously cached DNS result within the distributed DNS cache of the resolution node. In response to the FQDN being associated with the previously cached DNS result, the previously cached DNS result can be resolved as the DNS result. In response to the FQDN not being associated with the previously cached DNS result, the DNS result can be looked up in a DNS server external to the cluster of nodes and the DNS result can be stored in the distributed DNS cache of the resolution node.

In another aspect, it can be determined whether a group change among the cluster of nodes has occurred, wherein the group change indicates at least one of at least one new node among the cluster of nodes or at least one missing node among the cluster of nodes. Nodes among the cluster of nodes can be asynchronously notified of the group change. The resolution node can use the consistent hash to associate the request with a modified resolution node wherein the set of inputs to the consistent hash are modified based on the group change. In response to the modified resolution node and the resolution node being different nodes among the cluster of nodes, a previously cached DNS result associated with the request can be set to expire within the distributed DNS cache of resolution node.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

BRIEF DESCRIPTION OF THE DRAWINGS

FIGS. 2A-2C illustrate example bar graphs of DNS resolution output candidate tables of a consistent hash associated with a cluster of nodes before and after a group change in accordance with implementations of this disclosure;

DETAILED DESCRIPTION

Figure 1:
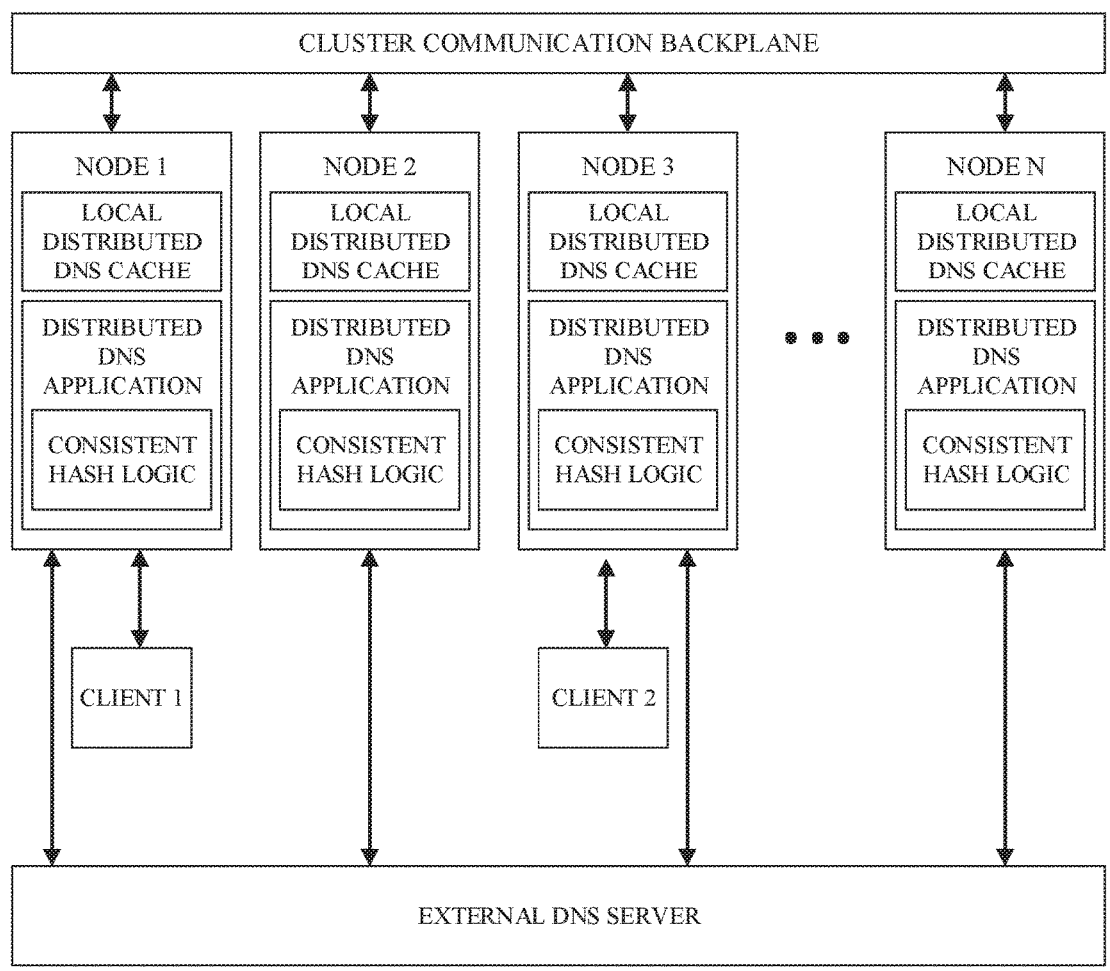
FIG. 1 illustrates an example of a cluster of nodes, an external DNS server, and associated clients in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

As used herein, the term "node" refers to a physical computing device, including, but not limited to, network devices, servers, processors, cloud architectures, or the like. In at least one of the various embodiments, nodes may be arranged in a cluster interconnected by a high-bandwidth, low latency network backplane. In at least one of the various embodiments, non-resident clients may communicate to the nodes in a cluster through high-latency, relatively low-bandwidth front side network connections, such as Ethernet, or the like.

The term "cluster of nodes" refers to one or more nodes that operate together to form a distributed file system. In one example, a cluster of nodes forms a unified namespace for a distributed file system. Nodes within a cluster may communicate information about nodes within the cluster to other nodes in the cluster. Nodes among the cluster of nodes function using the same logical inode number "LIN" mappings that describe the physical location of the data stored within the file system. For example, there can be a LIN to inode addresses mapping where inode addresses describe the physical location of the metadata stored for a file within the file system, and a data tree that maps logical block numbers to the physical location of the data stored. In one implementation, nodes among the cluster of nodes run a common operating system kernel. Clients can connect to any one node among the cluster of nodes and access data stored within the cluster. For example, if a client is connected to a node, and that client requests data that is not stored locally within the node, the node can then load the requested data from other nodes of the cluster in order to fulfill the request of the client. Data protection plans can exist that stores copies or instances of file system data striped across multiple drives in a single node and/or multiple nodes among the cluster of nodes, thereby preventing failures of a node or a storage drive from disrupting access to data by the clients. Metadata, such as inodes, for an entire distributed file system can be mirrored and/or synched across all nodes of the cluster of nodes.

Implementations are provided herein for using a distributed Domain Name Service ("DNS") cache that is distributed among nodes of a cluster of nodes operating as a distributed file system. A consistent hash can be used to determine a resolution node for a DNS request asking to resolve a specific Fully Qualified Domain Name ("FQDN"). The inputs to the consistent hashing algorithm can be the FQDN, a set of available nodes, and a set of all nodes in the cluster of nodes. By using a consistent hash, the process can reduce the sensitivity of the hashing algorithm output from changing when nodes are added or removed from the cluster of nodes or added or removed as participants in the distributed cache service. As each node in the cluster of nodes can independently calculate a resolution node for specific FQDN, there is no need to send control messages between nodes, as each node only needs to be aware of the set of available nodes in the cluster of nodes. Each node need only maintain in its cache entries related to the FQDN's the node is responsible for resolving as a resolution node. Should a resolution node not have an entry in its cache for a FQDN, it can consult with an external DNS server to resolve the FQDN and then store the address in its cache to be responsive to future requests.

Figure 7:
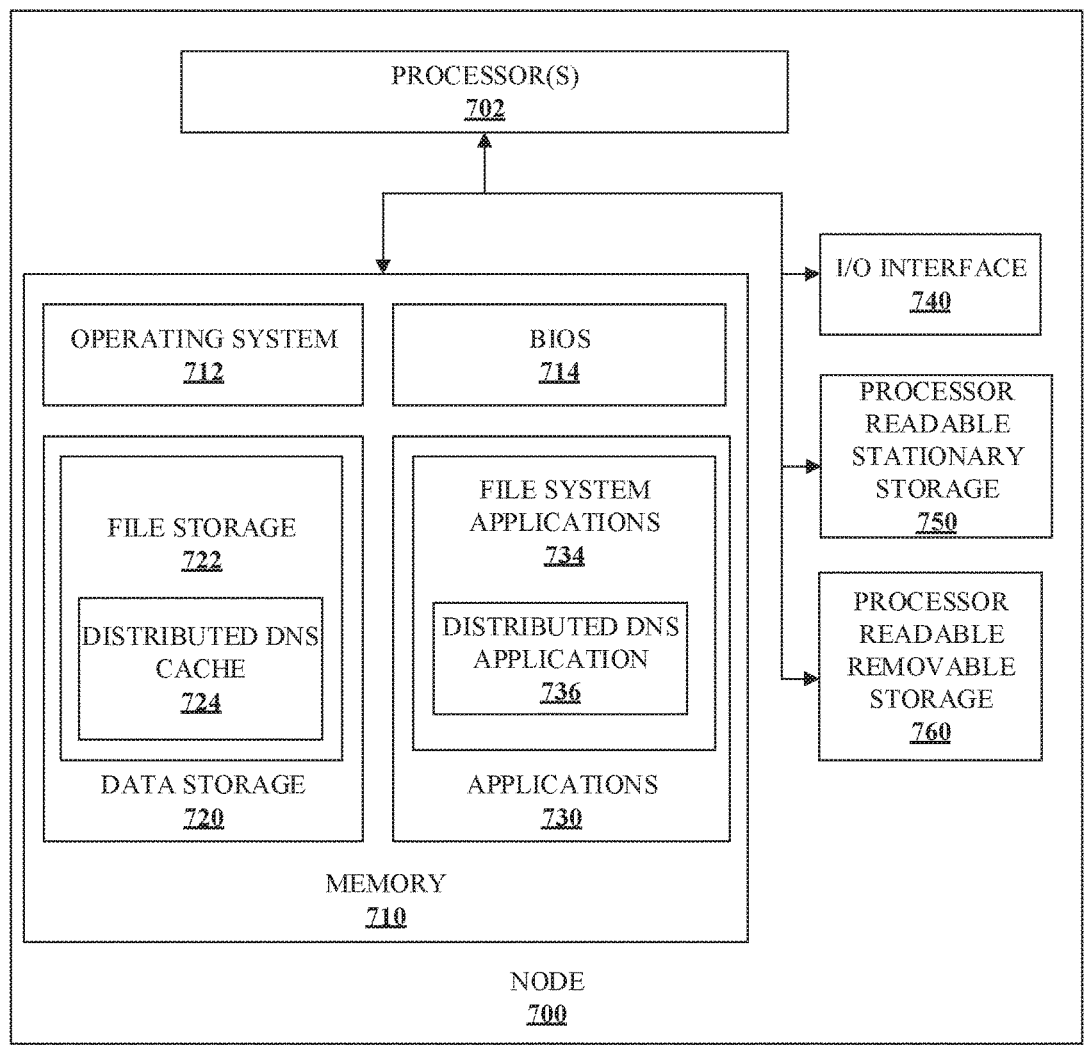
FIG. 7 illustrates an example block diagram of a node in accordance with implementations of this disclosure.

Referring now to FIG. 1, there is illustrated an example of a cluster of nodes, an external DNS server, and associated clients in accordance with implementations of this disclosure. It can be appreciated that not all the components associated with a node are depicted in FIG. 1. FIG. 7, as described in greater detail below, provides a more detailed examination of the components within an example node.

In some distributed file systems, clients can connect to a cluster of nodes by establishing a connection with one of the nodes. Thus each node in a file system, for example, Node 1, Node 2, Node 3, and Node "N" (where "N" is a positive integer greater than 3) as depicted in FIG. 1 can accept a connection from a client. Each node can maintain a copy of a distributed DNS application and a local distributed DNS cache. The Nodes can also contain the same consistent hash logic to independently resolve DNS requests to the appropriate resolution node. Nodes in the cluster of nodes are also able to subscribe to a global list of both available nodes and nodes that are subscribing participants to the distributed DNS service. The global list can be dynamically updated and asynchronously propagated to nodes of the cluster of nodes as nodes are added or removed to or from the cluster and/or as nodes are added or removed to or from the distributed DNS service.

A request to resolve an FQDN can be made to any node among the cluster of nodes. For example, Client 1 can make a DNS request to resolve an FQDN to Node 1 and Client 2 can make a DNS request to resolve an FQDN to Node 3. If a local cache is present and the resolution to the request is also present in the local cache it can be used, otherwise each node uses the consistent hash logic to determine the resolution node within the cluster of nodes that will be responsible for resolving the DNS request and managing its local distributed DNS cache. The resolution node can be the same node that the client connected to. The resolution node will first attempt to resolve the FQDN by looking to its local distributed DNS cache to determine if an entry already exists for the FQDN. If an entry does not exist, then it can communicate with an external DNS server. After receiving the response from the external DNS server, the address can be added as a new entry to its local distributed DNS cache. The resolved DNS address can either be sent to the node that initially received the DNS request, i.e., Node 1 for Client 1 in FIG. 1 for communication to the client or can be passed directly to the requesting client by the resolution node.

In one implementation, the inputs of consistent hash function are the requested FQDN, the set of nodes that are up and/or subscribed as participants to the distributed DNS service, and the set of all nodes among the cluster of nodes. The potential outputs to the consistent hash function are the set of nodes that are up nodes and/or nodes that are subscribed as participants to the distributed DNS service. In one implementation, the set of up nodes and/or nodes that are subscribed as participants to the DNS service can be weighted within the consistent hash logic. For example, some nodes may have more or less physical memory available in their cache compared with other nodes. Some nodes may have more or less available network bandwidth. Some nodes may have more or less historical usage patterns. These factors can provide for weighting nodes in the consistent hash logic and those weightings can be consistent across each nodes distributed DNS application.

It can be appreciated that one benefit of using the consistent hashing algorithm in this manner is that as nodes are added or removed to or from the cluster or to or from the distributed DNS service, the amount of FQDN's that are reassigned to new resolution nodes can be reduced. This can make it more likely that the resolution node will already have an entry in their local distributed DNS cache reducing external cluster communications to an external DNS server.

FIGS. 2A-2C illustrate example bar graphs of DNS resolution output candidate tables of a consistent hash associated with a cluster of nodes before and after a group change in accordance with implementations of this disclosure. FIG. 2A illustrates a four node cluster prior to a group change. As illustrated, the size of each node is directly proportional to the weighting of the node given within the consistent hashing algorithm. As state above, Nodes can be weighted based on the amount of resources they have available to process DNS requests. While this figure is presented in an abstract manner for ease of understanding, it can be appreciated that there is not one single resource but multiple resources that can be assessed for each node. For example, nodes can have varying storage space capacity, varying amount of processor resources, varying amounts of cache memory and system memory resources, etc. Thus, it can be appreciated that some nodes may be configured to handle greater responsibility in processing DNS requests. In one implementation, hardware profiles can be established for the varying types of nodes a distributed storage system supports. In another implementation, resources can be dynamically assessed in real time by a monitoring component on the node that can account for changed conditions such as drive failure, processor failure, storage capacity additions, etc. It can be appreciated that resource assessment for nodes can occur as a part of the group change process.

FIG. 2B illustrates an example bar graph of node resources after a group change occurs that adds a node. As shown, Node 5 has been added to the original cluster as shown in FIG. 2A. By using a consistent hash as described above with respect to FIG. 1, the addition of a new node, Node 5, won't necessarily change the existing resolution node assignments throughout the cluster. Instead, resolution node assignments can be assigned to Node 5 as needed while existing resolution nodes for certain FQDN's can remain static.

FIG. 2C illustrates an example bar graph of node resources after a group change occurs that removes a node. As shown, Node 3 has been removed from the original cluster as shown in FIG. 2A. During the group change process, in one implementation, nodes previously acting as resolution nodes for FQDN's will likely remain as resolution nodes for the same FQDN's. However, when a FQDN previously resolved by Node 3 can no longer be resolved by Node 3, it can be rehashed to one of the remaining nodes in the cluster.

It can be appreciated that during the transition period from FIG. 2A to FIG. 2C, e.g., during the transition period to a cluster with less nodes available to resolve DNS requests, the consistent hash may return different results based on which node the initial request is received. For example, Node 1 may be aware that Node 3 is no longer available to process DNS requests prior to Node 2 being made aware of the same. This can be because group change events are updated asynchronously across the cluster. After the asynchronous group change process completes across the cluster, all nodes should once again process consistent hash resolution node assignments in the same manner.

In one implementation, during a group change transition period, if a node receives a FQDN resolution request relayed from another node, the node will process the request by first looking to its cache and then communicating with an external DNS server to resolve the FQDN. It can be appreciated that this will cover two possible outcomes: (1) the node was previously the designated resolution node for the FQDN or (2) the node is about to become the designated resolution node after the group change process is propagated across the entire cluster of nodes.

In one example, looking at FIG. 2B, Node 4 gets an update from the group change process that Node 5 now exists as a part of the cluster of nodes. Node 3 then gets a request to resolve an FQDN, but because Node 3 has not yet received the group change update about Node 5 entering the cluster, Node 3 determines that the FQDN request should be processed by Node 4. Node 4 receives the FQDN request from Node 3, but determines that should not be resolving the FQDN and instead Node 5 should be the resolution node based on the output if its Distributed DNS Application that applies the consistent hash algorithm to a cluster that contains Node 5. In one implementation, Node 4 will still honor the FQDN request from Node 3 and either consult its local cache or request the address from the external DNS server. Node 4 can then cache the address for a short period of time with an expectation that because Node 4 is no longer the resolution node for the FQDN, the cache entry be set to expire from the local distributed DNS cache of Node 4 on an expedited time frame than the normal cache retention period.

In another example, looking at FIG. 2C, Node 2 gets an update that Node 3 has left the cluster and is no longer able to process DNS requests. It then receives an FQDN request that it calculates should be resolved by Node 4. Node 4 receives the FQDN request from Node 2, however is not yet aware that Node 3 has left the cluster. Node 4 determines that Node 3 should be the node that resolves the FQDN request; however, Node 4 can still process the request to resolve the FQDN. Because Node 4 does not believe it is the proper resolution node for this address, it can set the cache entry to expire from its local distributed DNS cache on an expedited time frame than the normal cache retention period. Continuing the example, Node 4 then gets a group change notice that Node 3 has left the cluster and then determines that it is now responsible for the FQDN it just processed. Node 4 can then determine the cache entry related to this FQDN that was previously set to expire and extend the validity time of the cache entry to the normal cache time period.

Figure 3:
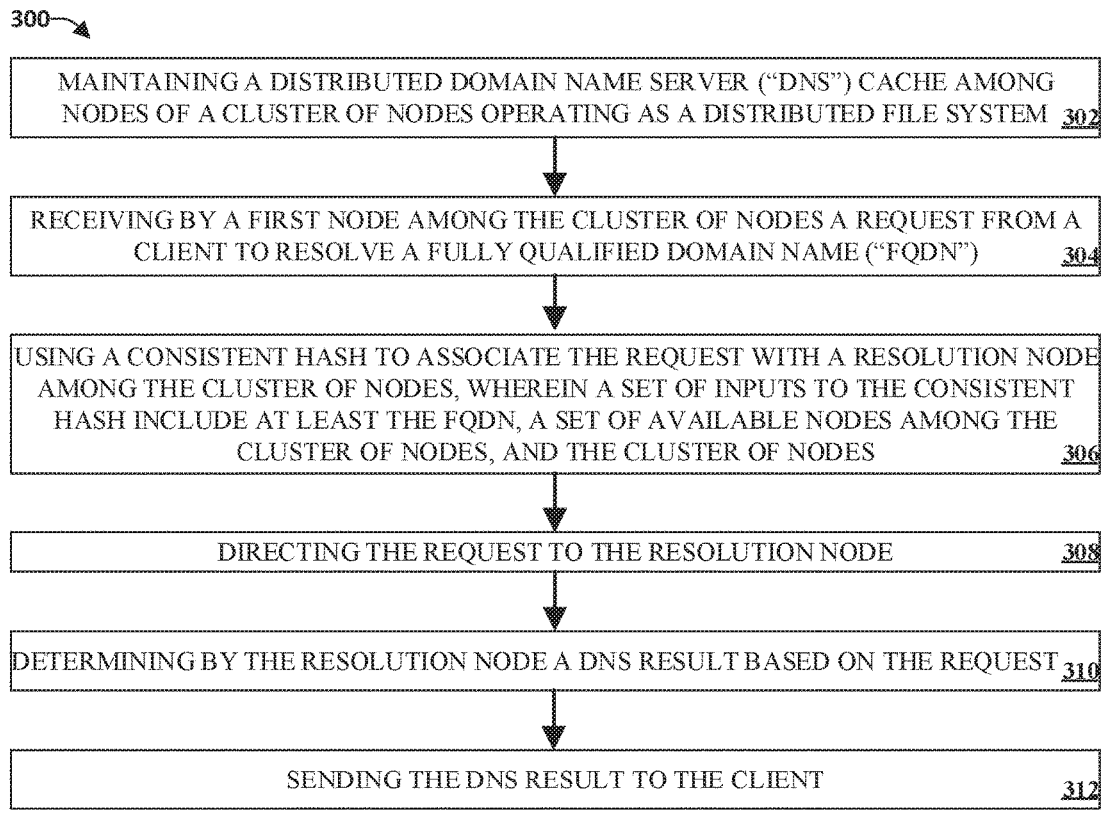
FIG. 3 illustrates an example method for processing a DNS request by a distributed file system using a consistent hash in accordance with implementations of this disclosure.
Figure 4:
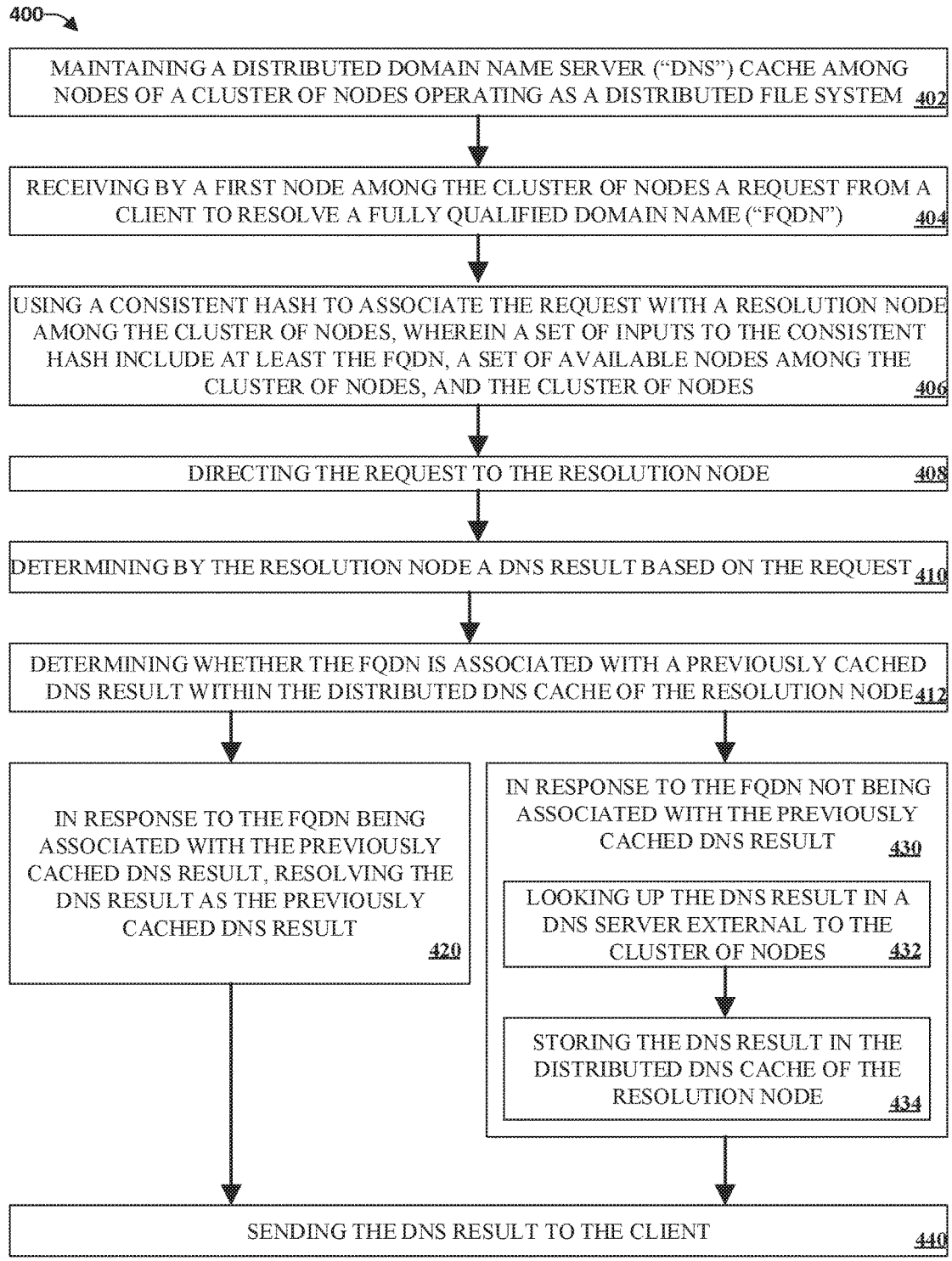
FIG. 4 illustrates an example method for processing a DNS request using by a distributed file system using a consistent hash including using and modifying a distributed cache in accordance with implementations of this disclosure.
Figure 5:
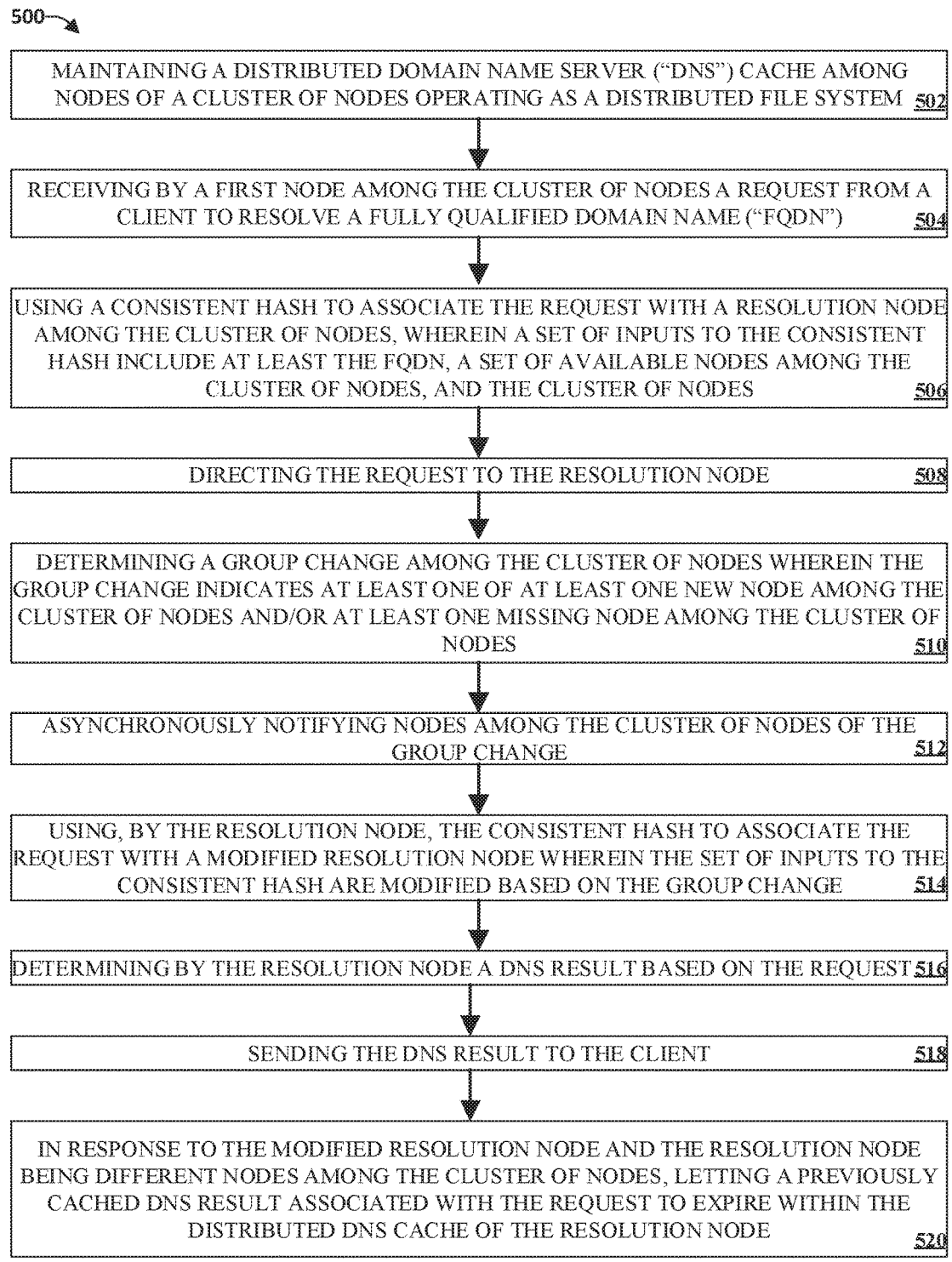
FIG. 5 illustrates an example method for processing a DNS request using by a distributed file system using a consistent hash including a group change in accordance with implementations of this disclosure.

FIGS. 3-5 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

Referring now to FIG. 3, there is illustrated an example method for processing a DNS request by a distributed file system using a consistent hash in accordance with implementations of this disclosure. At 302, a distributed DNS cache can be maintained among nodes of a cluster of nodes operating as a distributed file system. At 304, a first node among the cluster of nodes can receive a request from a client to resolve an FQDN.

In one implementation, each node can also maintain a short term cache that duplicates the resolution node. The short term cache can be updated each time the first node receives responses from other nodes assigned as resolution nodes for DNS requests the first node is processing on behalf of its clients. If the FQDN is found in this short term cache, then there is no need to forward the request to the resolution node.

At 306, a consistent hash can be used to associate the request with a resolution node among the cluster of nodes, wherein the set of inputs to the consistent hash include at least the FQDN, a set of available nodes among the cluster of nodes, and the cluster of nodes. In one implementation, the resolution node and the first node can be the same node. For example, the consistent hash may resolved the resolution node to be the same node that received the request form the client.

In one implementation, the set of available nodes among the cluster of nodes is the set of nodes that are up and running and/or the set of nodes that are active subscribers to the distributed DNS service. For example, some nodes may be deemed non-participants to the distributed DNS service.

In one implementation, the set of available nodes is based on a set of permissions associated with the client. For example, some nodes may be not visible to certain clients due to access restrictions associated with the client and therefore should not be resolution nodes for that client. Continuing that example, clients can be associated with user or group permissions that restrict their access to the cluster of nodes to a limited subset of nodes, and the distributed DNS service restrict the inputs to the consistent hashing algorithm to not include nodes outside the limited subset in evaluating what node should be the resolution node for a DNS request.

In one implementation, nodes among the set of available nodes can be weighted based on the capacity of nodes to process DNS cache requests as discussed supra.

At 308, the request can be directed to the resolution node. At 310, the resolution node can determine a DNS result based on the request. At 312, the DNS result can be sent to the client. In one implementation, the first node can send the DNS result to the client. In another implementation, the resolution node can send the DNS result to the client.

Referring now to FIG. 4, there is illustrated an example method for processing a DNS request using by a distributed file system using a consistent hash including using and modifying a distributed cache in accordance with implementations of this disclosure. At 402, a distributed DNS cache can be maintained among nodes of a cluster of nodes operating as a distributed file system. At 404, a first node among the cluster of nodes can receive a request from a client to resolve an FQDN. At 406, a consistent hash can be used to associate the request with a resolution node among the cluster of nodes, wherein the set of inputs to the consistent hash include at least the FQDN, a set of available nodes among the cluster of nodes, and the cluster of nodes. At 408, the request can be directed to the resolution node. At 410, the resolution node can determine a DNS result based on the request.

At 412, it can be determined whether the FQDN is associated with a previously cached DNS result. In response to the FQDN being associated with a previously cached DNS result, at 420, the DNS result can be resolved using the previously cached DNS result.

In response to the FQDN not being associated with a previously cached DNS result, at 430, the method can proceed to steps 432-434. At 432, the DNS result can be looked up in a DNS server external to the cluster of nodes. At 434, the DNS result can be stored within the distributed DNS cache of the resolution ode.

At 440, the DNS result can be sent to the client.

Referring now to FIG. 5, there is illustrated an example method for processing a DNS request using by a distributed file system using a consistent hash including a group change in accordance with implementations of this disclosure. At 502, a distributed DNS cache can be maintained among nodes of a cluster of nodes operating as a distributed file system. At 504, a first node among the cluster of nodes can receive a request from a client to resolve an FQDN. At 506, a consistent hash can be used to associate the request with a resolution node among the cluster of nodes, wherein the set of inputs to the consistent hash include at least the FQDN, a set of available nodes among the cluster of nodes, and the cluster of nodes. At 508, the request can be directed to the resolution node.

At 510, a group change can be determined among the cluster of nodes, wherein the group change indicates at least one of at least one new node among the cluster of nodes or at least one missing node among the cluster of nodes. At 512, nodes among the cluster of nodes can be asynchronously notified of the group change. At 514, the resolution node can use the consistent hash to associate the request with a modified resolution node, wherein the set of inputs to the consistent hash are modified based on the group change.

At 516, the resolution node can determine a DNS result based on the request. At 518, the DNS result can be sent to the client.

At 520, in response to the modified resolution node and the resolution node being different nodes among the cluster of nodes, a previously cached DNS result associated with the request can be set to expire within the distributed DNS cache of the resolution node.

Figure 6:
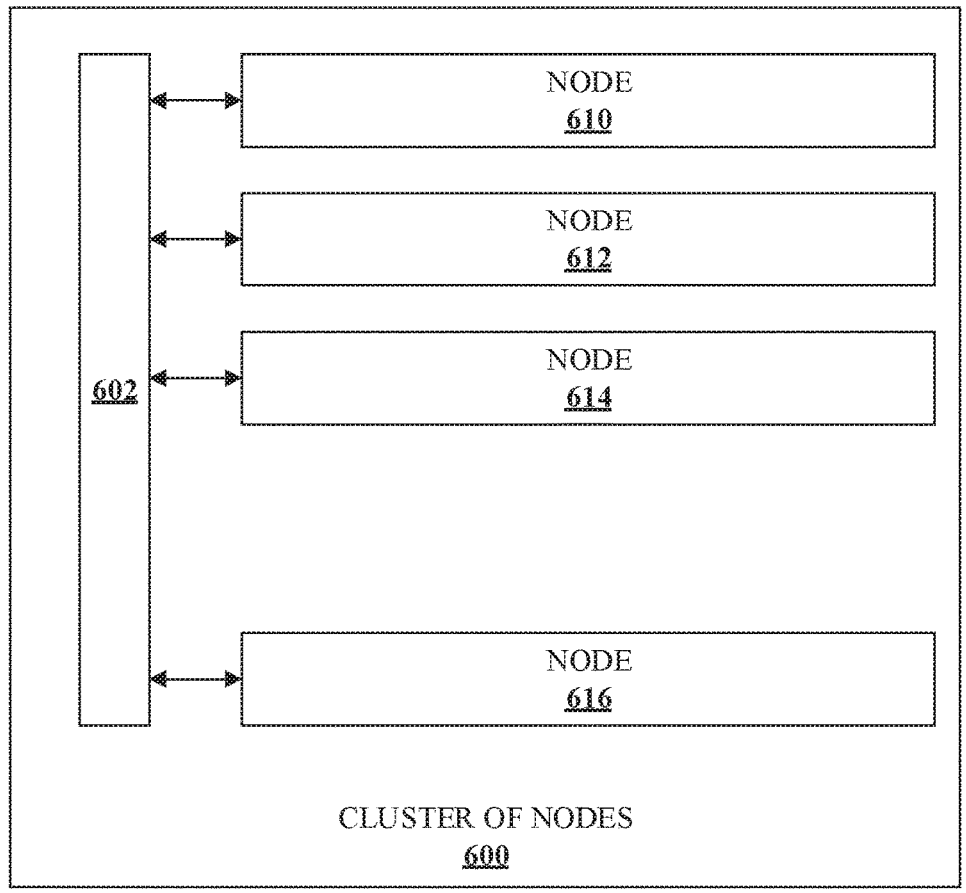
FIG. 6 illustrates an example block diagram of a cluster of nodes in accordance with implementations of this disclosure.

FIG. 6 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can include processors, power blocks, cooling apparatus, network interfaces, input/output interfaces, etc. Although not shown, cluster of nodes typically includes several computers that merely require a network connection and a power cord connection to operate. Each node computer often includes redundant components for power and interfaces. The cluster of nodes 600 as depicted shows Nodes 610, 612, 614 and 616 operating in a cluster; however, it can be appreciated that more or less nodes can make up a cluster. It can be further appreciated that nodes among the cluster of nodes do not have to be in a same enclosure as shown for ease of explanation in FIG. 6, and be geographically disparate. Backplane 602 can be any type of commercially available networking infrastructure that allows nodes among the cluster of nodes to communicate amongst each other in as close to real time as the networking infrastructure allows. It can be appreciated that the backplane 602 can also have a separate power supply, logic, I/O, etc. as necessary to support communication amongst nodes of the cluster of nodes.

It can be appreciated that the Cluster of Nodes 600 can be in communication with a second Cluster of Nodes and work in conjunction to provide a distributed file system. Nodes can refer to a physical enclosure with a varying amount of CPU cores, random access memory, flash drive storage, magnetic drive storage, etc. For example, a single Node could contain, in one example, 36 disk drive bays with attached disk storage in each bay. It can be appreciated that nodes within the cluster of nodes can have varying configurations and need not be uniform.

FIG. 7 illustrates an example block diagram of a node 700 in accordance with implementations of this disclosure.

Node 700 includes processor 702 which communicates with memory 710 via a bus. Node 700 also includes input/output interface 740, processor-readable stationary storage device(s) 750, and processor-readable removable storage device(s) 760. Input/output interface 740 can enable node 700 to communicate with other nodes, mobile devices, network devices, and the like. Processor-readable stationary storage device 750 may include one or more devices such as an electromagnetic storage device (hard disk), solid state hard disk (SSD), hybrid of both an SSD and a hard disk, and the like. In some configurations, a node may include many storage devices. Also, processor-readable removable storage device 760 enables processor 702 to read non-transitive storage media for storing and accessing processor-readable instructions, modules, data structures, and other forms of data. The non-transitive storage media may include Flash drives, tape media, floppy media, disc media, and the like.

Memory 710 may include Random Access Memory (RAM), Read-Only Memory (ROM), hybrid of RAM and ROM, and the like. As shown, memory 710 includes operating system 712 and basic input/output system (BIOS) 714 for enabling the operation of node 700. In various embodiments, a general-purpose operating system may be employed such as a version of UNIX, LINUX™, a specialized server operating system such as Microsoft's Windows Server™ and Apple Computer's IoS Server™, or the like.

Applications 730 may include processor executable instructions which, when executed by node 700, transmit, receive, and/or otherwise process messages, audio, video, and enable communication with other networked computing devices. Examples of application programs include database servers, file servers, calendars, transcoders, and so forth. Applications 730 may include, for example, File System Application 734 that can include DNS resolution application 736 and associated consistent hash logic as shown in FIG. 1 and according to implementations of this disclosure. It can be appreciated that Distributed DNS Application 736 can store information in memory 710 such as in a Distributed DNS cache 724 or the like for use when processing DNS requests as discussed supra.

Human interface components (not pictured), may be remotely associated with node 700, which can enable remote input to and/or output from node 700. For example, information to a display or from a keyboard can be routed through the input/output interface 740 to appropriate peripheral human interface components that are remotely located. Examples of peripheral human interface components include, but are not limited to, an audio interface, a display, keypad, pointing device, touch interface, and the like.

Data storage 720 may reside within memory 710 as well, storing file storage 722 data such as metadata or LIN data. It can be appreciated that LIN data and/or metadata can relate to rile storage within processor readable stationary storage 750 and/or processor readable removable storage 760. For example, LIN data may be cached in memory 710 for faster or more efficient frequent access versus being stored within processor readable stationary storage 750. In addition, Data storage 720 can also host a distributed DNS cache 724 in accordance with implementations of this disclosure.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
   maintaining a distributed Domain Name Server ("DNS") cache among nodes of a cluster of nodes operating as a distributed file system;
   receiving by a first node among the cluster of nodes a request from a client to resolve a Fully Qualified Domain Name ("FQDN");
   using a consistent hash to associate the request with a resolution node among the cluster of nodes, wherein a set of inputs to the consistent hash include at least the FQDN, a set of available nodes among the cluster of nodes, and the cluster of nodes;
   directing the request to the resolution node;
   determining by the resolution node a DNS result based on the request; and
   sending the DNS result to the client.

2. The method of claim 1 further comprising:
   determining whether the FQDN is associated with a previously cached DNS result within the distributed DNS cache of the resolution node; and
   in response to the FQDN being associated with the previously cached DNS result, resolving the DNS result as the previously cached DNS result.

3. The method of claim 2, further comprising:
   in response to the FQDN not being associated with the previously cached DNS result:
      looking up the DNS result in a DNS server external to the cluster of nodes; and
      storing the DNS result in the distributed DNS cache of the resolution node.

4. The method of claim 1, wherein nodes among the set of available nodes are weighted based on the capacity of nodes to process DNS cache requests.

5. The method of claim 1, further comprising:
   determining a group change among the cluster of nodes wherein the group change indicates at least one of at least one new node among the cluster of nodes or at least one missing node among the cluster of nodes;
   asynchronously notifying nodes among the cluster of nodes of the group change; and
   using, by the resolution node, the consistent hash to associate the request with a modified resolution node wherein the set of inputs to the consistent hash are modified based on the group change.

6. The method of claim 5, further comprising:
   in response to the modified resolution node and the resolution node being different nodes among the cluster of nodes, letting a previously cached DNS result associated with the request to expire within the distributed DNS cache of the resolution node.

7. The method of claim 1 wherein the set of available nodes is based on a set of permissions associated with the client.

8. A system comprising a cluster of nodes operating as a distributed file system wherein nodes among the cluster of nodes contain at least one storage device and at least one hardware processor configured to:
   maintain a distributed Domain Name Server ("DNS") cache among nodes of the cluster of nodes;
   receive by a first node among the cluster of nodes a request from a client to resolve a Fully Qualified Domain Name ("FQDN");
   use a consistent hash to associate the request with a resolution node among the cluster of nodes, wherein a set of inputs to the consistent hash include at least the FQDN, a set of available nodes among the cluster of nodes, and the cluster of nodes;
   direct the request to the resolution node;
   determine by the resolution node a DNS result based on the request; and
   send the DNS result to the client.

9. The system of claim 8, further configured to:
   determine whether the FQDN is associated with a previously cached DNS result within the distributed DNS cache of the resolution node; and
   in response to the FQDN being associated with the previously cached DNS result, resolve the DNS result as the previously cached DNS result.

10. The system of claim 9, further configure to:
    in response to the FQDN not being associated with the previously cached DNS result:
       look up the DNS result in a DNS server external to the cluster of nodes; and
       store the DNS result in the distributed DNS cache of the resolution node.

11. The system of claim 8, wherein nodes among the set of available nodes are weighted based on the capacity of nodes to process DNS cache requests.

12. The system of claim 8, further configured to:
    determine a group change among the cluster of nodes wherein the group change indicates at least one of at least one new node among the cluster of nodes or at least one missing node among the cluster of nodes;
    asynchronously notify nodes among the cluster of nodes of the group change; and
    use, by the resolution node, the consistent hash to associate the request with a modified resolution node wherein the set of inputs to the consistent hash are modified based on the group change.

13. The system of claim 12, further configured to:
    in response to the modified resolution node and the resolution node being different nodes among the cluster of nodes, let a previously cached DNS result associated with the request to expire within the distributed DNS cache of the resolution node.

14. The system of claim 8 wherein the set of available nodes is based on a set of permissions associated with the client.

15. A non-transitory computer readable medium with program instructions stored thereon to perform the following acts:
    maintaining a distributed Domain Name Server ("DNS") cache among nodes of a cluster of nodes operating as a distributed file system;
    receiving by a first node among the cluster of nodes a request from a client to resolve a Fully Qualified Domain Name ("FQDN");
    using a consistent hash to associate the request with a resolution node among the cluster of nodes, wherein a set of inputs to the consistent hash include at least the FQDN, a set of available nodes among the cluster of nodes, and the cluster of nodes;
    directing the request to the resolution node;
    determining by the resolution node a DNS result based on the request; and
    sending the DNS result to the client.

16. The non-transitory computer readable medium of claim 15, with program instructions stored thereon to further perform the following acts:
    determining whether the FQDN is associated with a previously cached DNS result within the distributed DNS cache of the resolution node; and
    in response to the FQDN being associated with the previously cached DNS result, resolving the DNS result as the previously cached DNS result.

17. The non-transitory computer readable medium of claim 16, with program instructions stored thereon to further perform the following acts:
    in response to the FQDN not being associated with the previously cached DNS result:
       looking up the DNS result in a DNS server external to the cluster of nodes; and
       storing the DNS result in the distributed DNS cache of the resolution node.

18. The non-transitory computer readable medium of claim 15, wherein nodes among the set of available nodes are weighted based on the capacity of nodes to process DNS cache requests.

19. The non-transitory computer readable medium of claim 15, with program instructions stored thereon to further perform the following acts:
- determining a group change among the cluster of nodes wherein the group change indicates at least one of at least one new node among the cluster of nodes or at least one missing node among the cluster of nodes;
- asynchronously notifying nodes among the cluster of nodes of the group change; and
- using, by the resolution node, the consistent hash to associate the request with a modified resolution node wherein the set of inputs to the consistent hash are modified based on the group change.

20. The non-transitory computer readable medium of claim 19, with program instructions stored thereon to further perform the following acts:
- in response to the modified resolution node and the resolution node being different nodes among the cluster of nodes, letting a previously cached DNS result associated with the request to expire within the distributed DNS cache of the resolution node.

* * * * *